Patented May 25, 1948

2,442,226

UNITED STATES PATENT OFFICE 2,442,226

REMOVAL OF DISSOLVED SILICA FROM ALKALI METAL ALUMINATE SOLUTIONS

James R. Wall, Collinsville, Ill., assignor to Aluminum Company of America, Pittsburgh, Pa., a corporation of Pennsylvania No Drawing. Application March 14, 1944, Serial No. 526,477

4 Claims. (Cl. 23—52)

This invention relates to the purification of alkali metal aluminate solutions, and relates particularly to the removal of silica from alkali metal aluminate solutions from which alumina is to be precipitated.

In extracting alumina from bauxite, clays and other siliceous alumina-bearing materials by methods involving the formation of a sodium (or other alkali metal) aluminate solution from alumina in the raw material, and subsequent precipitation of aluminum hydrate therefrom, the sodium aluminate solution may contain dissolved silica values. The presence of such silica is objectionable, for during precipitation of aluminum hydrate from the solution by the usual methods silica likewise precipitates and thus constitutes an impurity in the aluminum hydrate.

It is an object of this invention to provide a method of removing silica from alkali metal aluminate solutions, and particularly to provide an economical method which permits removal of dissolved silica values from alkali metal aluminate solutions to any desired degree, including substantially complete freedom of the solution from silica.

In accordance with this invention, dissolved silica is removed from sodium (or other alkali metal) aluminate solutions by forming in the solution an undissolved hydrous material containing such silica, in addition to divalent iron and alumina values, and separating it from the solution. The insoluble material mentioned can be produced by digesting the sodium aluminate solution to be purified, under proper conditions, with gelatinous ferrous hydroxide, with the result that the ferrous hydroxide combines with alumina and silica values from the solution and forms the insoluble material. Alternatively, it may be formed in the solution by adding a divalent iron compound capable of providing ferrous oxide values by reaction in the solution. Ferrous sulfate, ferrous chloride, and ferrous carbonate are examples of such compounds.

I have found that when the ferrous compounds mentioned in the preceding paragraph are added to sodium aluminate solutions which are free of silica, an insoluble, hydrous, gelatinous complex containing alumina and ferrous oxide values is produced. This material is reasonably uniform in composition, corresponding approximately to the formula $4FeO.Al_2O_3.4H_2O$, and may be considered to be hydrous ferrous aluminate. When it is added to a silica-bearing sodium aluminate solution under the conditions hereinafter described, it combines with silica values in the solution, forming the undissolved material mentioned in the preceding paragraph. It is believed that when such undissolved material is formed by adding one of the ferrous compounds mentioned in the preceding paragraph to a silica-bearing sodium aluminate solution, the mechanics of the formation of the silica-bearing insoluble material are similar to those just described, i. e., the hydrous complex containing ferrous oxide and alumina values is first formed, and it then combines with silica present. Consequently, this invention may be considered as involving the use of hydrous ferrous aluminate to remove silica from alkali metal aluminate solutions.

In carrying out the process, the ferrous compound is added to a silica-bearing sodium aluminate solution, and the solution is then preferably agitated for sufficient time to permit forming the hydrous material containing ferrous oxide, alumina, and the amount of silica which it is desired to remove from the solution, after which such material is separated from the solution, as by a filtering, settling, or centrifuging operation. The sludge thus obtained is a gray, gelatinous material of the composition previously indicated. Other matter may also be present in it, including some trivalent iron, though ordinarily the iron content is principally in the form of divalent iron. During the circulating of the ferrous material in the solution it is advisable to maintain the solution at a temperature of at least 50° C., and it is preferable to employ a temperature of at least 75° C.

The duration of the digestion operation depends on such factors as the relative amounts of ferrous material and silica values present in the solution, the rate of circulation of ferrous material through the solution, the temperature of the solution, and the extent to which it is desired to free the solution of silica. By proper choice of conditions, it is possible to remove substantially all, or any desired percentage, of the silica in the solution.

It is desirable to employ sufficient ferrous material to provide in the solution a molecular ratio of ferrous oxide values to silica to be removed of at least 1.2 to 1. In general, increasing this ratio of ferrous oxide to silica to be removed increases the rapidity of the silica removal, other conditions being constant. Likewise, the smaller the percentage of silica in the sodium aluminate solution to be purified the greater the ratio of ferrous oxide values to silica desirable. Consequently, it is advantageous, in carrying out the invention, to utilize countercurrent flow of the ferrous material and the sodium aluminate solution being purified.

This can be effected readily by maintaining an upwardly moving column or stream of sodium aluminate solution, and allowing the ferrous material to settle through it. For example, sodium aluminate solution can be introduced continuously into a tank adjacent the bottom thereof, and allowed to flow from the tank at a higher level, while ferrous material is fed into the tank below the level of the aforementioned outlet from the tank, the admission and removal of sodium aluminate solution being sufficiently slow to permit the insoluble material to settle downward to the bottom of the tank where it can be removed as desired. In such a method of operation, by introducing sufficient ferrous material into the solution to provide the desired ratio of ferrous oxide values to silica in the column of rising solution, the amount of ferrous oxide values available for uniting with silica values will be highest in the upper portion of the column, where the percentage of dissolved silica present is lowest, and as the ferrous material settles through the solution and the proportion of ferrous oxide values available to remove silica becomes progressively less, the percentage of dissolved silica present is progressively greater.

In carrying out the invention it is important to avoid converting the ferrous oxide values to a ferric state, for although hydrous ferric oxide may remove some silica values from the solution, silica is not removed from the solution thereby nearly as effectively as by means of this invention. Consequently, in carrying out the invention, it is desirable to avoid oxidation of the ferrous iron values to a ferric state, and for that reason it is advantageous to exclude air from the sodium aluminate solution as far as possible. It may not always be feasible to prevent some oxidation of the ferrous iron to ferric iron from taking place, but that is immaterial so long as sufficient unoxidized ferrous iron remains to effect removal of silica to the desired level.

Likewise, it is advisable to prevent access of the insoluble, hydrous silica-, alumina-, and ferrous oxide-bearing material to oxygen prior to, or during, separation thereof from the sodium aluminate solution, for otherwise it at least partially oxidizes and becomes colloidal, with the result that it becomes more difficult to separate from the solution. Furthermore, the presence of calcium compounds such as lime or hydrated lime, in the solution being purified has in some instances been found to be undesirable, the efficiency of the process in removing silica from the solution being impaired by such compounds.

Although as mentioned above the ferrous oxide values can be formed in the sodium aluminate solution by reaction between ferrous sulfate or ferrous chloride and the solution, this results in the formation of a sodium salt dissolved in the solution. If aluminum hydrate is precipitated from the solution and the residual solution is then used to supply soda ($Na_2O$) values for extracting additional alumina from raw material, and the cycle is repeated over and over, the sodium salt formed in the solution as mentioned above increases in amount during each cycle, and as a result the amount of sodium available for the formation of sodium aluminate becomes less, unless additional soda is added; also there is the further difficulty that as the proportion of such sodium salt in the solution increases, the amount of sodium aluminate which can be carried in solution decreases. Hence, it is sometimes advantageous to utilize previously prepared ferrous hydroxide, rather than forming ferrous oxide values in situ in the sodium aluminate solution by adding ferrous sulfate or ferrous chloride. If previously prepared ferrous hydroxide is added to the solution to be purified, it is usually desirable that it be freshly precipitated material, for the efficiency of the ferrous hydroxide in the process diminishes with aging thereof.

Ferrous carbonate is not subject to the objections mentioned in connection with ferrous sulfate or ferrous chloride, since it merely adds sodium carbonate to the solution upon reaction, and sodium carbonate is a commonly used source of sodium values in the extraction of alumina from materials containing alumina. Furthermore, ferrous carbonate produced by electrolytic oxidation of iron in a sodium chloride electrolyte while bubbling carbon dioxide through the electrolyte has the further advantage that when it is used in carrying out this invention the insoluble silica bearing complex formed is especially readily filterable from the sodium aluminate solution.

However, the above-mentioned objections to ferrous sulfate or chloride can also be avoided by preparing a precipitated hydrous complex of ferrous oxide and alumina values by neutralizing a ferrous sulfate or ferrous chloride solution with a sodium aluminate solution, and after separating the precipitate from the solution and washing it to remove the sodium sulfate or sodium chloride formed in the reaction, using it in carrying out the invention. Such a precipitate does not lose efficiency upon aging, as in the case of ferrous hydroxide.

In view of the efficacy of the process described above in removing silica from sodium aluminate solutions when only a very small percentage of silica is present, it may be economical on occasion to combine the removal of silica by means of that process with a preliminary treatment which is capable of removing some silica, but is not effective in removing small percentages of silica from a sodium aluminate solution. For example, the percentage of silica in a sodium aluminate solution can be reduced to a fairly low figure by digesting the solution with sodium aluminum silicate, followed by removal of the sodium aluminum silicate from the solution, and the silica remaining in the solution can then be removed in the manner previously described.

As an example of such a process, a sodium aluminate solution containing dissolved silica was obtained by leaching a sintered mixture of limestone and clay with sodium carbonate solution. The solution after filtering contained 28.3 g./l. of alumina values, 85.5 g./l. of soda ($Na_2O$) values, and a dissolved silica content of 0.61 g./l. 20 g./l. of finely divided sodium aluminum silicate was then added, and the solution was agitated for 5 hours by a centrifugal pump, the solution being kept at a temperature of 99° C. When filtered, the sodium aluminate solution contained 0.072 g./l. of dissolved silica.

Ferrous carbonate, prepared by electrolytically oxidizing iron in a sodium chloride electrolyte while bubbling carbon dioxide through the electrolyte, was settled from the electrolyte out of contact with air and after being washed was added to the sodium aluminate solution in an amount sufficient to provide 1.65 g./l. thereof, the solution being in a closed tank from which air was excluded. The mixture was then agitated for 6 hours by a centrifugal pump while maintained at 99° C. After the solution had been filtered to remove undissolved material, it had a dissolved silica content equal to only 0.008 g./l.

I claim:

1. The process of removing dissolved silica from alkali metal aluminate solutions, comprising forming in the solution undissolved hydrous material containing such silica, ferrous oxide, and alumina values by introducing material containing ferrous hydroxide as the predominant constituent into the solution, the molecular ratio of ferrous hydroxide introduced to dissolved silica to be removed from the solution being at least 1.2 to 1, and thereafter separating said material from the solution.

2. The process of removing dissolved silica from alkali metal aluminate solutions, comprising forming in the solution undissolved hydrous material containing such silica, ferrous oxide, and alumina values by introducing into the solution a ferrous compound capable of providing material containing ferrous hydroxide as the predominant constituent in the solution by reaction, the molecular ratio of ferrous hydroxide introduced to dissolved silica to be removed from the solution being at least 1.2 to 1, and thereafter separating said material from the solution.

3. The process of removing dissolved silica from alkali metal aluminate solutions, comprising forming in the solution under substantially non-oxidizing conditions undissolved hydrous material containing such silica, ferrous oxide, and alumina values by introducing material containing ferrous hydroxide as the predominant constituent into the solution, the molecular ratio of ferrous hydroxide introduced to dissolved silica to be removed from the solution being at least 1.2 to 1, and thereafter separating said material from the solution.

4. The process of removing dissolved silica from alkali metal aluminate solutions, comprising forming in the solution undissolved hydrous material containing such silica, ferrous oxide, and alumina values by introducing material containing hydrous ferrous aluminate as the predominant constituent into the solution, the molecular ratio of ferrous oxide values in the ferrous aluminate employed to dissolved silica to be removed from the solution being at least 1.2 to 1, and thereafter separating the said undissolved material from the solution.

JAMES R. WALL.

REFERENCES CITED

The following references are of record in the file of this patent:

UNITED STATES PATENTS

| Number | Name | Date |
|---|---|---|
| 938,432 | Peffer | Oct. 26, 1909 |
| 1,137,860 | Howard | May 4, 1915 |
| 1,214,991 | Blough et al. | Feb. 6, 1917 |
| 1,404,083 | Bassett | Jan. 17, 1922 |
| 1,413,720 | Goldschmidt | Apr. 25, 1922 |
| 1,747,759 | Darr et al. | Feb. 18, 1930 |
| 1,778,083 | Marburg | Oct. 14, 1930 |
| 1,798,261 | Horsfield | Mar. 31, 1931 |
| 1,858,165 | McAdoo | May 10, 1932 |
| 1,959,448 | Staufer et al. | May 22, 1934 |
| 2,280,998 | Brown | Apr. 28, 1942 |